United States Patent [19]
Lee

[11] Patent Number: 5,863,123
[45] Date of Patent: Jan. 26, 1999

[54] PROFILE THERMOCOUPLE OF A TRANSVERSE-TYPE DIFFUSION FURNACE

[75] Inventor: Seung-Jin Lee, Suwon, Rep. of Korea

[73] Assignee: Samsung Electronics Co., Ltd., Suwon, Rep. of Korea

[21] Appl. No.: 775,458

[22] Filed: Dec. 30, 1996

[30] Foreign Application Priority Data

Apr. 24, 1996 [KR] Rep. of Korea ............... 1996 12652

[51] Int. Cl.⁶ .................................................. G01K 7/02
[52] U.S. Cl. ........................... 374/179; 374/208; 136/230
[58] Field of Search .................... 374/137, 141, 374/166, 179, 208; 136/230, 235

[56] References Cited

U.S. PATENT DOCUMENTS

| | | | |
|---|---|---|---|
| 2,707,198 | 4/1955 | Jones | 136/235 |
| 2,849,518 | 8/1958 | MacDonald | 136/235 |
| 3,262,315 | 7/1966 | Lux et al. | 374/179 |
| 3,516,873 | 6/1970 | Bonkowski et al. | 136/230 |
| 3,913,058 | 10/1975 | Nishio et al. | 136/230 |
| 4,841,274 | 6/1989 | Yagher, Jr. et al. | 374/208 |
| 4,842,419 | 6/1989 | Nietert | 374/208 |
| 4,850,717 | 7/1989 | Clark et al. | 374/208 |
| 5,366,290 | 11/1994 | Mayer et al. | 374/208 |
| 5,456,761 | 10/1995 | Auger et al. | 374/179 |
| 5,462,359 | 10/1995 | Reichl et al. | 374/208 |

*Primary Examiner*—G. Bradley Bennett
*Attorney, Agent, or Firm*—Jones & Volentine, L.L.P.

[57] ABSTRACT

A profile thermocouple employs a detachable and heat-resistant fixing assembly. The fixing assembly has a first fixing tube and a second fixing tube assembled with each other. A temperature sensor is inserted in the first fixing tube, and extension wires are inserted in the second fixing tube. The temperature sensor includes a plurality of alloy wires, a plurality of insulators, and a protecting tube. The fixing assembly is made from heat-resistant metal. Therefore, the temperature sensor is prevented from being short-circuited or broken, such that the profile thermocouple more precisely senses the temperature in the transverse-type diffusion furnace.

5 Claims, 3 Drawing Sheets

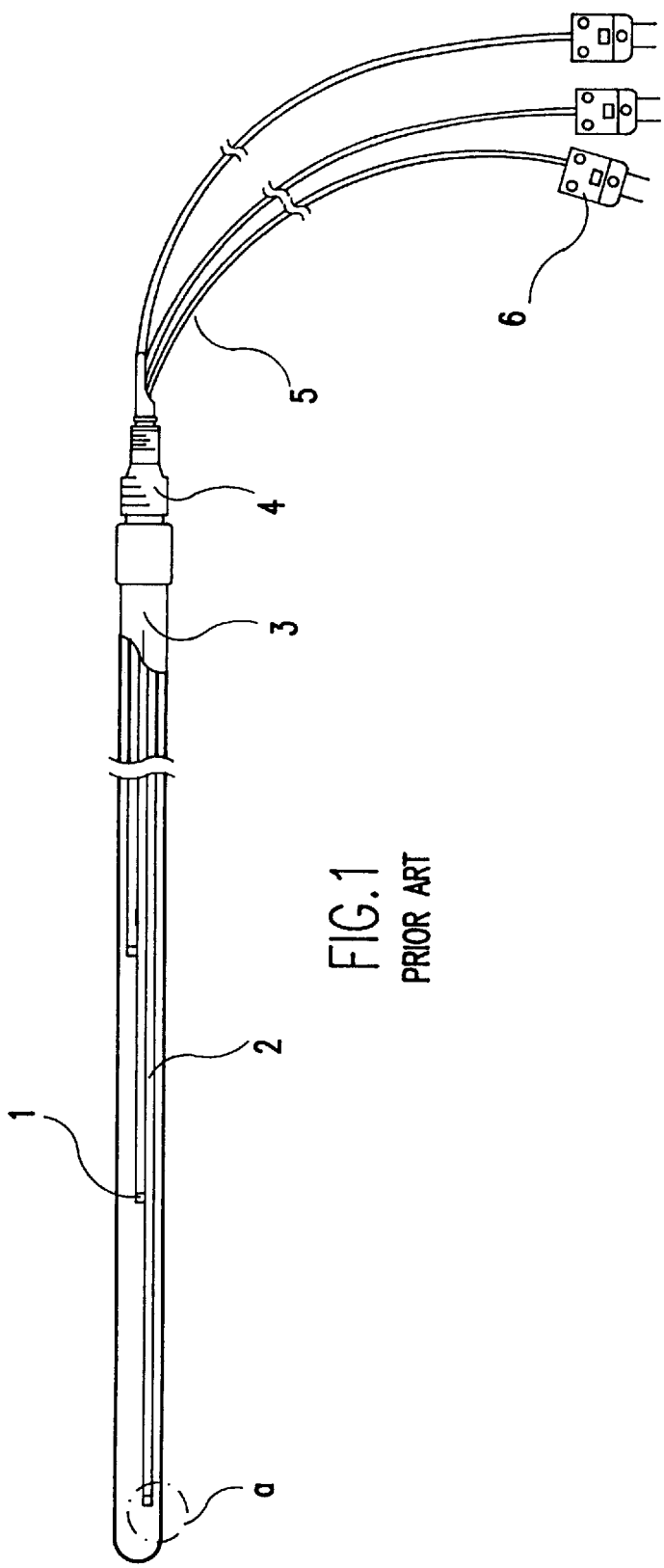
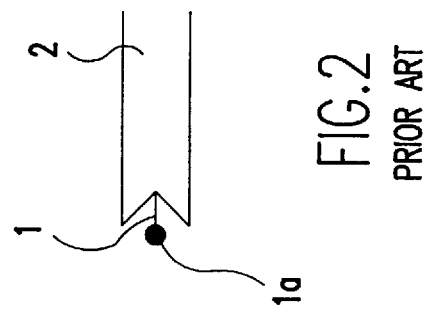
FIG.1 PRIOR ART
FIG.2 PRIOR ART

PROFILE THERMOCOUPLE OF A TRANSVERSE-TYPE DIFFUSION FURNACE

BACKGROUND OF THE INVENTION

1. Field of the Invention

The present invention relates to a profile thermocouple of a transverse-type diffusion furnace used in a diffusion process for semiconductor devices, and more particularly, to a profile thermocouple of a transverse-type diffusion furnace, which is firmly fixed and heat resistant, and which can more stably sense the temperature in the transverse-type diffusion furnace.

2. Background of Related Art

In general, a diffusion furnace is an appliance used in a diffusion process for semiconductor devices, and a thermocouple is employed as a sensor for sensing the temperature in the diffusion furnace.

The thermocouple is made by joining two kinds of metals to each other, e.g., platinum and an alloy of platinum and rhodium, chrome and aluminum, or iron and constantan. In the thermocouple, when there is temperature-difference between the two joined metals, electric current flows therebetween. In this case, the temperature-difference is estimated by measuring the electromotive force generated between the two joined metals.

Usually, the diffusion furnace is classified as a vertical-type or a longitudinal-type diffusion furnace, and a horizontal-type or a transverse-type diffusion furnace. The thermocouple employed in the transverse-type diffusion furnace may be classified as a spike thermocouple or a profile thermocouple. The spike thermocouple is inserted in the diffusion furnace in the transverse direction of the diffusion furnace, so as to sense the temperature of the outer heater. The profile thermocouple is inserted in the diffusion furnace in the longitudinal direction of the diffusion furnace, so as to sense the temperature inside of the inner quartz furnace.

FIG. 1 shows the construction of a conventional profile thermocouple. Referring to FIG. 1, the conventional profile thermocouple includes a plurality of alloy wires 1, a plurality of insulators 2, and a protecting tube or sheath 3 made from quartz. The alloy wires 1, each of which has two different kinds of metals joined to each other, sense the temperature at several portions such as the front, the middle, and the rear portions inside of the transverse-type diffusion furnace. The insulators 2 respectively wrap and insulate each of the alloy wires 1. The protecting tube 3 protects a part of the alloy wires 1 coated with the insulators 2, which protected part is inserted in the diffusion furnace.

Particularly, as shown in FIG. 2, a contact probe 1a protrudes from a distal free end of each alloy wire 1 coated with each insulator 2. The contact probe 1a is thicker than each alloy wire 1.

Referring again to FIG. 1, the conventional profile thermocouple as described above also includes a heat contraction tube 4 fixed to the rear end of the protecting tube 3. The heat contraction tube 4 is made from Teflon. A plurality of extension wires 5 of the alloy wires 1 extend outwardly from the heat contraction tube 4. Each extension wire 5 is connected to a connector 6 which is then connected to a measuring device (not shown).

In the conventional profile thermocouple as described above, the alloy wires 1 wrapped by the insulators 2, the protecting tube 3, and the extension wires 5 are fixed by the heat contraction tube 4, and then the protecting tube 3 is inserted in the diffusion furnace (not shown), so that the temperature in the diffusion furnace may be measured.

However, since the heat contraction tube 4 is located adjacent to the diffusion furnace, the heat contraction tube 4 is apt to be subject to the high temperature heat during the diffusion process. In this case, the heat contraction tube 4 can be burned or melted, causing deformation or damage.

When the heat contraction tube 4 is damaged as described above, the alloy wires 1 may be short-circuited and the temperature in the diffusion furnace can not be precisely measured. Moreover, such a short-circuit may cause the manufacturing system to be disordered or the quality of the manufactured semiconductor devices to be degraded.

Further, since the profile thermocouple is difficult to assemble or disassemble after the alloy wires 1, insulators 2, protecting tube 3, and extension wires 5 are fixed by the heat contraction tube 4, it is difficult to fix and maintain the profile thermocouple. Furthermore, the life of the thermocouple is shortened.

SUMMARY OF THE INVENTION

The present invention has been made to overcome one or more of the above-described problems of the conventional art, and accordingly it is an object of the present invention to provide a profile thermocouple which employs a detachable and heat-resistant fixing assembly instead of the heat contraction tube, and which can thereby more stably sense the temperature in the transverse-type diffusion furnace.

To achieve the above object, the present invention provides a profile thermocouple of a transverse-type diffusion furnace, the profile thermocouple comprising: a first means inserted in the transverse-type diffusion furnace for sensing temperatures at various positions therein, the first means including a plurality of alloy wires, a plurality of insulators, and a protecting tube, each of the alloy wires having different two kinds of metal joined to each other, the insulators respectively wrapping and insulating each of the alloy wires, the protecting tube protecting a part of the alloy wires coated with the insulators, the protected part of the alloy wires being inserted in the transverse-type diffusion furnace; a plurality of extension wires extending outwardly from the transverse-type diffusion furnace so as to transfer an electromotive force generated by a heat in the transverse-type diffusion furnace out of the transverse-type diffusion furnace, each of the extension wires being connected to a connector; and a means for fixing and connecting the first means to the extension wires, the fixing and connecting means including a first fixing tube and a second fixing tube assembled with each other, the first means being inserted in the first fixing tube, and the extension wires being inserted in the second fixing tube.

BRIEF DESCRIPTION OF THE DRAWINGS

The above objects, and other features and advantages of the present invention will become more apparent by describing in detail preferred embodiments thereof with reference to the attached drawings, in which:

FIG. 1 is a partly cut-away side view of a conventional profile thermocouple for sensing the temperature in a transverse-type diffusion furnace;

FIG. 2 is an enlarged view of portion "a" in FIG. 1;

DETAILED DESCRIPTION OF PREFERRED EMBODIMENTS

Hereinafter, several preferred embodiments of the present invention will be described in detail with reference to the accompanying drawings.

Figure 3:
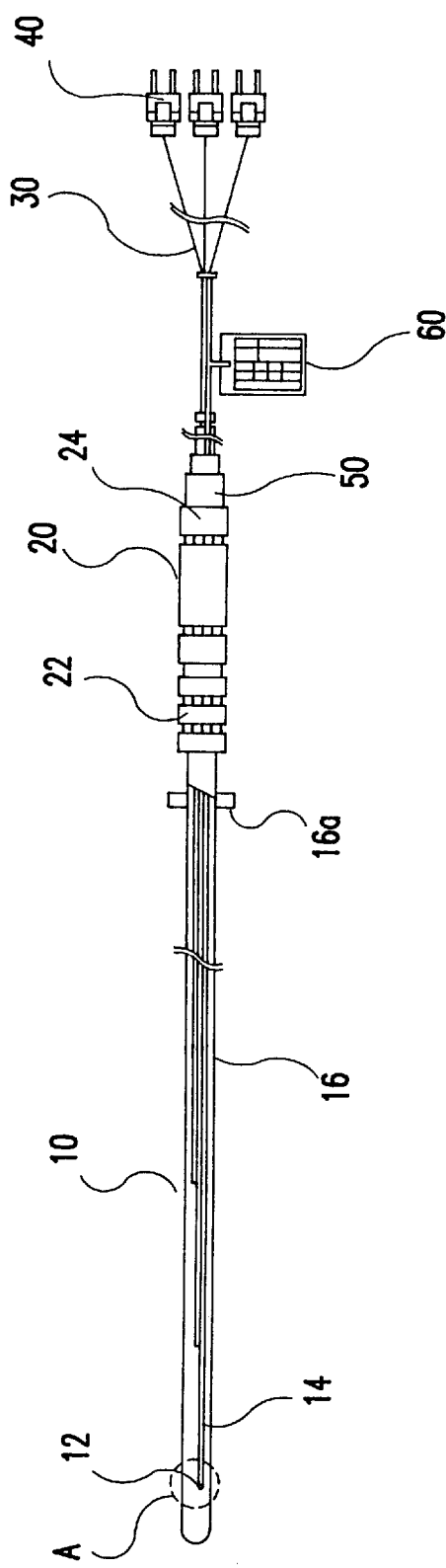
FIG. 3 is a partly cut-away side view of a profile thermocouple for sensing the temperature in a transverse-type diffusion furnace according to the present invention.

FIG. 3 is a partly cut-away side view of a profile thermocouple for sensing the temperature in a transverse-type diffusion furnace according to the present invention.

As shown, the profile thermocouple according to the present invention includes a temperature sensor 10 for sensing the temperature in the transverse-type diffusion furnace (not shown). The temperature sensor 10 is inserted in the transverse-type diffusion furnace. A plurality of extension wires 30 extend outwardly from the transverse-type diffusion furnace so that the temperature in the transverse-type diffusion furnace can be measured and then transferred outside thereof. Each extension wire 30 is connected to a connector 40 which is then connected to a measuring device (not shown) disposed outside of the diffusion furnace.

The temperature sensor 10 includes a plurality of alloy wires 12, a plurality of insulators 14, and a protecting tube or a sheath 16 made from quartz. The alloy wires 12, each of which has two different kinds of metal joined to each other, sense the temperature at several portions such as the front, the middle, and the rear portions inside of the transverse-type diffusion furnace. The insulators 14 respectively wrap and insulate each of the alloy wires 12. The protecting tube 16 protects a part of the alloy wires 12 coated with the insulators 14, which protected part is inserted in the diffusion furnace.

A threshold or stopper 16a is formed at an outer surface of the protecting tube 16 so as to limit the maximum length of the protecting tube 16 inserted in the transverse-type diffusion furnace. However, the threshold 16a may be omitted according to other embodiments of the present invention.

Figure 4:
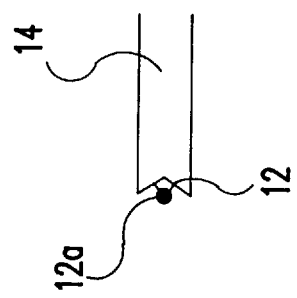
FIG. 4 is an enlarged view of portion "A" in FIG. 3.

Particularly, as shown in FIG. 4, a contact probe 12a protrudes from a distal free end of each alloy wire 12 coated with each insulator 14. The contact probe 12a is thicker than each alloy wire 12 so as to prolong the life of the contact probe 12a.

The profile thermocouple according to the present invention as described above further includes a fixing assembly 20 for fixing the protecting tube 16 of the temperature sensor 10. The fixing assembly 20 is coupled at one end to the protecting tube 16, with the extension wires 30 extending outwardly from the other end.

Figure 5:
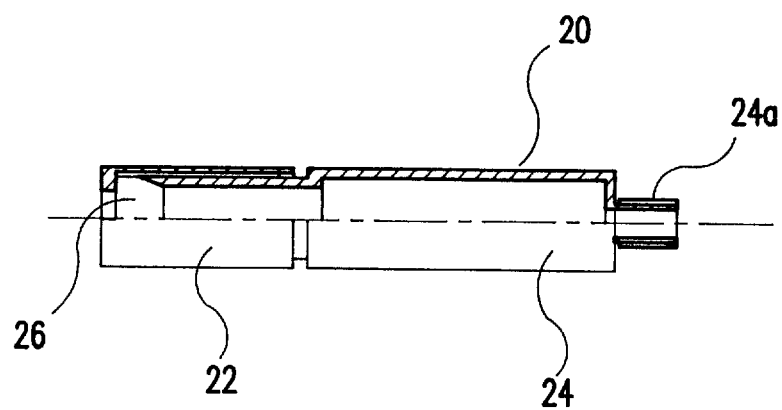
FIG. 5 is a half sectioned side view of the fixing assembly employed in the profile thermocouple shown in FIG. 3.

Referring to FIG. 5, the fixing assembly 20 includes a first fixing tube 22 and a second fixing tube 24 which are assembled together with a male/female connection such as screw joint or other equivalent means. The temperature sensor 10 is inserted in the first fixing tube 22 and the extension wires 30 are inserted in the second fixing tube 24, and then they are assembled with each other.

Preferably, the fixing assembly 20 may be made from a very light and heat-resistant metal such as duralumin which is an alloy of aluminum, copper, manganese, magnesium, etc.

Figure 6:
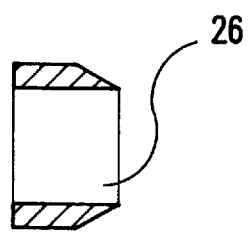
FIG. 6 is a sectional view of a ferrule shown in FIG. 5.

More preferably, the fixing assembly 20 may further include a ring-shaped ferrule 26 as shown in FIG. 6. The ferrule 26 is inserted in the first fixing tube 22 so as to firmly fix the protecting tube 16 in the first fixing tube 22.

It is also preferred that the fixing assembly 20 include an elastic member 50 (see FIG. 3) disposed at a neck 24a of the second fixing tube 24. The extension wires 30 are inserted in and supported by the elastic member 50, so that the elastic member 50 enables the extension wires 30 to be flexible without being folded back.

Reference numeral 60 merely designates a tag on which the measured temperatures can be recorded.

In the profile thermocouple according to the present invention as described above, the temperature sensor 10 and the extension wires 30 are assembled with and are connected to each other by means of the fixing assembly 20 including the first fixing tube 22 and the second fixing tube 24, and then the temperature sensor 10 encased by the protecting tube 16 is inserted in the diffusion furnace (not shown) to sense the temperature therein.

In the profile thermocouple having the above described construction, since the protecting tube 16 and the extension wires 30 are firmly fixed by a fixing assembly made from a light and heat-resistant metal, the danger that a portion of the thermocouple adjacent to the furnace may be damaged is reduced considerably, even when that portion is subjected to a large quantity of heat under high temperature.

Therefore, the profile thermocouple according to the present invention has several advantages. That is, the temperature sensor 10 is prevented from being short-circuited or broken, and thereby the temperature in the diffusion furnace can be sensed more precisely. Also, the possibility of manufacturing system abnormalities caused by a faulty temperature sensor are reduced, with the quality of the manufactured semiconductor devices increasing accordingly.

Furthermore, since the thermocouple is assembled and fixed by means of the detachable fixing assembly 20, it is easy to assemble and disassemble the thermocouple, so that it is much easier to maintain and fix the thermocouple.

In the drawings and specification, there have been disclosed typical preferred embodiments of the invention and, although specific terms are employed, they are used in a generic and descriptive sense only and not for purposes of limitation, the scope of the invention being set forth in the following claims and their equivalents.

What is claimed is:

1. A profile thermocouple of a transverse-type diffusion furnace, said profile thermocouple comprising:

a temperature sensor comprising a plurality of alloy wires, a plurality of insulators, and an elongate protecting tube, each of said alloy wires having two different kinds of metal joined to each other, said insulators respectively wrapping and insulating said each of said alloy wires, and said protecting tube protecting a part of said alloy wires coated with said insulators;

a plurality of extension wires, each connected at a first end to corresponding ones of a plurality of connectors;

a means for fixing and connecting said temperature sensor to said extension wires, said fixing and connecting means including a first fixing tube and a second fixing tube removably coupled with each other, said second fixing tube further comprising a neck portion projecting from an end of the second fixing tube opposite said coupling, and an elastic member of sufficient width to surround said neck portion and extend a fixed distance beyond an edge of said neck portion, said protecting tube of said temperature sensor being inserted in an end of said first fixing tube opposite said coupling, and second ends of said extension wires being inserted in said second fixing tube through said elastic member and said neck portion; and a stopping means formed on an outer surface of the protecting tube and spaced apart from said first fixing tube so as to limit an insertion length of the temperature sensor.

2. A profile thermocouple as claimed in claim 1, wherein said fixing and connecting means is made from a light and heat-resistant metal.

3. A profile thermocouple as claimed in claim 2, wherein said fixing and connecting means is made from duralumin.

4. A profile thermocouple as claimed in claim 1, wherein said fixing and connecting means comprises a ring-shaped ferrule inserted in said first fixing tube, said ring-shaped ferrule firmly fixing said protecting tube in said first fixing tube.

5. A profile thermocouple as claimed in claim 1, wherein said first fixing tube and said second fixing tube are removably coupled using a male/female connection means.

* * * * *